United States Patent [19]

Cordani

[11] Patent Number: 5,730,868
[45] Date of Patent: Mar. 24, 1998

[54] REUSABLE SPILL CONTAINMENT APPARATUS

[76] Inventor: Peter J. Cordani, 1374 N. Killian Dr., Lake Park, Fla. 33403

[21] Appl. No.: 652,777

[22] Filed: May 23, 1996

[51] Int. Cl.⁶ ........................................ C02F 1/28
[52] U.S. Cl. ........................... 210/242.4; 210/924
[58] Field of Search ............................. 210/282, 924, 210/DIG. 5, 242.4

[56] References Cited

U.S. PATENT DOCUMENTS

| | | | |
|---|---|---|---|
| 344,958 | 7/1886 | Grant | 210/282 |
| 1,040,179 | 10/1912 | Evans | 210/282 |
| 3,617,566 | 11/1971 | Oshima | 210/282 |
| 3,960,719 | 6/1976 | Bresson | 210/DIG. 5 |
| 3,976,570 | 8/1976 | McCray | 210/242.4 |
| 4,031,839 | 6/1977 | Pedone | 210/924 |
| 4,061,573 | 12/1977 | Biron | 210/282 |
| 4,111,813 | 9/1978 | Preus | 210/282 |
| 4,332,854 | 6/1982 | Parker | 210/924 |
| 4,406,793 | 9/1983 | Kruyer | 210/DIG. 5 |
| 5,186,831 | 2/1993 | DePetris | 210/924 |
| 5,223,129 | 6/1993 | Hsieh | 210/150 |
| 5,227,072 | 7/1993 | Brinkley | 210/924 |
| 5,264,134 | 11/1993 | McCamy | 210/924 |
| 5,350,527 | 9/1994 | Kitko | 210/DIG. 5 |
| 5,364,535 | 11/1994 | Buckalew | 210/924 |
| 5,458,773 | 10/1995 | Holland | 210/924 |

*Primary Examiner*—Cynthia L. Nessler
*Attorney, Agent, or Firm*—McHale & Slavin

[57] ABSTRACT

The instant invention is a reusable housing for placement of petroleum absorbent polypropylene material within a chamber for placement in the bilge area of a boat. The polypropylene material is capable of absorbing petroleum products such as diesel fuel, engine oil, transmission oil, and the like petroleum products while repelling water. The housing has a plurality of through holes for accessing the chamber allowing fluid passage with a convenient threaded coupling.

4 Claims, 1 Drawing Sheet

REUSABLE SPILL CONTAINMENT APPARATUS

FIELD OF THE INVENTION

This invention relates to the field of hazardous waste recovery and in particular, to the recovery of waste accidentally discharged in the bilge area of a boat.

BACKGROUND OF THE INVENTION

In 1979 the EPA adopted final regulations as published at 44 Fed. Reg. 50, 766 governing the discharge of hazardous substances under the Clean Water Act, 33 U.S.C. § 1321. The basic thrust of the Clean Water Act may be summarized as an authorization to the EPA to determine, by regulation, those quantities of oil and any hazardous substance, the discharge of which may be harmful to the public health or welfare. The term discharge is defined broadly to include any spilling, leaking, pumping, pouring, emitting, emptying or dumping. In light of these regulations, discharge of any quantity of an oil or a hazardous substance is subject to civil penalties. In addition, the Federal Government is authorized under Section 311(c) of the Act to remove or arrange for the removal of oil or a hazardous substance and to assess the cost of removal to the owner or operator of any facility from which the discharge in a reportable quantity occurs.

These regulations have had a direct effect on the marine industry and in particular, marine craft that rely upon internal combustion engines for purposes of movement. As with any internal combustion engine, the basic lubricating product for such an engine is oil and the fuel is also a petroleum product. Gasoline is the fuel used on smaller boats while diesel fuel is a primary fuel used on larger boats, such as yachts, and ships. Gasoline evaporates while diesel fuel has a tendency to collect in the engine area.

The problem occurs in that, by design, all areas of the boat drain toward a collecting area commonly referred to as the bilge. A bilge pump is positioned to automatically pump out fluid that collects in the bilge so as to prevent the craft from sinking. By design, most boats have a continual in-flow of water. For example, the propeller shafts have seats that utilize sea water to maintain lubrication during operation. In this manner, while the propeller shaft rotates water is introduced into the boat where it is collected in the bilge and then pumped overboard. Even if a boat is not in use, the propeller shaft coupling will have a slow drip which over time will eventually fill the bilge and cause the bilge pump to operate and pump overboard.

All boat use the lower portion of the hull as a temporary collection area for waste fluids. The waste fluids are pumped overboard and include non-hazardous waste such as air conditioner condensate, excess rain water, and shower overflow. In addition, every boat has numerous through holes for water intake or discharge, many of which may leak further adding to the non-hazardous waste that can be pumped overboard.

Thus, the bilge plays an integral part of any water craft, and due to its location, will also pick up hazardous waste contaminants. For instance, all engines leak oil. An oil leak will eventually drain to the bottom of the hull causing direct contamination of the bilge area. An automatic discharge of the bilge will carry out such contaminants resulting in pollution of the waterway.

For these reasons, the EPA has targeted marine craft as a major contributor to water pollution making it a fine with penalties upward of $5,000 for even a minuscule discharge of oil from a boat bilge. Despite this penalty, it is not uncommon to find a oil sheen on the water which is a clear indication that oil was pumped out of the bilge area, most instances are accidental. In some instances the boat owner's believes he can avoid detection due to the vast number of boats. However, the EPA is getting more sophisticated in its detection process and is capable of sampling an oil sheen and matching it with the boat that was responsible for discharge. As previously mentioned, the EPA has it within its authority to clean up the oil sheen and require the owner of the water craft that caused the spill to pay for the clean up. This amount can easily exceed the penalties imposed.

Insurance companies now include policies to insure the owner of the water craft should a spill occur, the result of which drives up the cost of insurance.

For these reasons, boat owners and manufacturers have taken a particular interest in trying to prevent contamination of the bilge area by redesign, placement of an oil monitor or collector within the bilge area, or isolation of the bilge pump. The most obvious method of preventing discharge is by making the bilge pump manual. The result is flooding of a boat by defeating the primary purpose for which an automatic bilge pump was designed. Another manner is to containerize the area directly beneath the engine, however, the accumulation of the petroleum products in sufficient quantity presents a fire hazard.

Another method of containment is by use of absorbents placed beneath the engine or in the bilge area that are capable of absorbing only oil, thereby separating the oil from the water wherein only the water is discharged. Polypropylene is one such material placed in the bilge in the form of sheets or pillows wherein they absorb oil and, when saturated, are removed for proper disposal. The problem with the use of an absorbent is that when the bilge pump operates, the level of water in the bilge is drawn down allowing the bilge pump to suck the oil out of the absorbent or cause the pump to run dry and burn out. Should the pump burn out, the bilge will continue to fill eventually flooding the water craft.

Thus, what is lacking in the art is a means for removal of oil, diesel and other like fuels that will not clog a bilge pump when used in a marine application.

SUMMARY OF THE INVENTION

The instant invention is a device for collection of petroleum waste products in the bilge area of a boat. In particular, the device is a low cost two-piece plastic canister having means for an interior chamber for insertion of a polypropylene material. The polypropylene material absorbs engine oil, grease, fuel, and transmission fluid while repelling water.

The canister is placed within the confines of the bilge to absorb the petroleum based products before discharge. The shape of the housing prevents the polypropylene material from matting or accumulating close to the pump, thereby preventing clogging of the pump or oil suction. In addition, the normal boat movement will allow the housing to move along the surface of the water and prohibit adhesion to unfinished fiberglass.

The housing permits disposal and placement of the polypropylene with infinite reuse of the housing. Reuse requires removal of spent polypropylene and insertion of fresh polypropylene material. The housing is preferably constructed of impervious plastic that inhibits adhesion of most petroleum products from sticking to the housing leaving the housing and bilge area with a clean appearance.

Thus, an objective of the instant invention is to disclose a polypropylene absorbent material for placement within a reusable housing for purposes of absorbing petroleum products in such a manner so as to avoid interfering with bilge pump operation or adhesion to the sidewalls of an unfinished bilge area.

Yet still another objective of the instant invention is to disclose a circular housing that allows fluids to pass through the housing in such a manner so as to inhibit petroleum products from adhering to the surface of the housing.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention is to be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
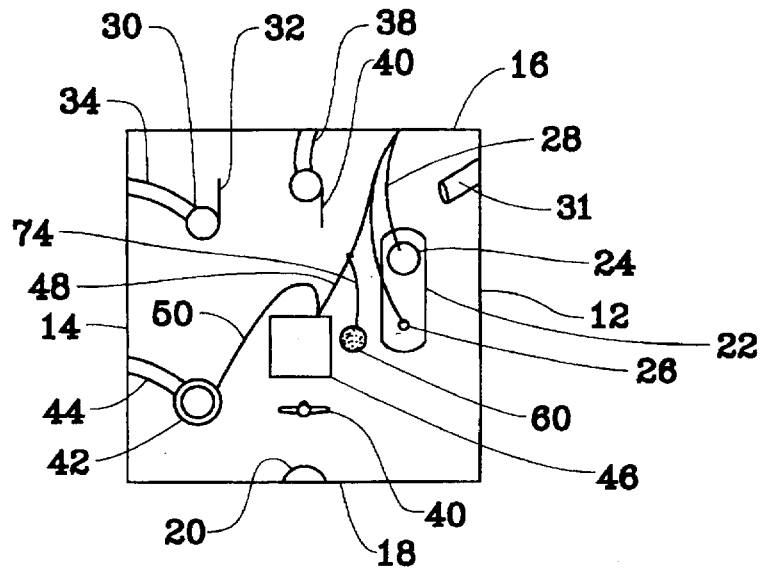
FIG. 1 is a pictorial view of a boat bilge area with the instant invention placed therein.

Referring to the drawings, FIG. 1 is a pictorial of a conventional bilge collection area 10 having sidewall 12 and 14, and end wall 16 and 18. End wall 18 includes through hole 20 which allows fluids to drain from other areas of the boat for collection into the bilge area. It should be noted that numerous bilge area configurations are possible with the sole purpose of collecting excess water or fluids wherein their discharge is possible to prevent flooding of the boat.

In this illustration the bilge area depicted showing the numerous items that not only limit the space in the bilge but create numerous obstacles that can limit the use of prior art oil absorbents. The bilge area typically includes a transducer 22 having secondary through hole connections for placement of a speed detector 24 and temperature probe 26. These detectors relay information through a bundle of wires 28 that extend upward out of the bilge area. Also illustrated is a through hole for various accessories such as air conditioner intake valve 30 having manual shut off handle 32 and strainer 34. Air conditioner condensate drain 31 is depicted which allows the condensate from the air conditioner unit or units to drain into the bilge area. Valve 36 provides an intake for boats equipped with a facility having hose connection 38 and a manual shut off handle 30 for operation. Drain plug 40 is also depicted and consists of an oversized wing nut that is threaded into the hull for use in draining of the bilge area when the boat is dry docked. When a boat is placed in the water, the bilge area is drained by pump 42 which discharges water through hose 44 to an overboard location. The bilge pump is electrically coupled to a float valve 46 by electrical wire bundle 48, the float valve 46 is then coupled to a battery source, not shown, by electrical wire bundle 50.

As previously mentioned the amount of fluids that can drain into the bilge area are numerous. The bilge area is located at the lowest portion of the hull for collection of such fluids. Collection may consist of engine oil, transmission fluid, anti-freeze for close loop engines, seawater manifold leaks, air conditioning condensate, shower drains, leaks from through-hull fittings including transducers, cooling systems, and so forth. Any through hole coupling constructed of metal may lead to electrolysis wherein the fiberglass around the fitting softens allowing fluid leakage due to permeation of the fiber glass or leakage through the through hole seal.

As previously mentioned the bilge area can be filled with fluids from numerous and varied areas including propeller lubricating water, excess rain water, bait tank overflow, and so forth. Thus the end result is an irreplaceable drainage area that necessitates the need for a pump system to prevent the overflow of the bilge area which could result in damage if not sinking of a boat. As the engine area cannot be isolated from the bilge should the bilge overflow when contaminated from constituents that leak from the engine area, the result is contamination of the waterway directly surrounding the boat. In this manner an absorbent material may be placed within the bilge area but, as previously mentioned, the prior art usage of absorbent material can easily snag any of the aforementioned components placed within the bilge area which effectively neutralizes the absorbing qualities if the absorbent material is not able to contact the contaminating constituents. For instance, fluid entering through hole 20 may accumulate around the pump 42 for a loose absorbent material may have snagged on the air conditioning condensate line 31 adjacent to the transducer. Thus, while some of the petroleum by-products may be absorbed into the absorbent material, the majority of the contaminating constituents will be drawn into the pump and discharged through overflow tube 44. In addition, most boat owners will not risk placing loose absorbent material within the bilge area for if the absorbent material gets drawn into the pump, it may cause the pump to burn out leading to an overflow of the bilge and possible sinking of the boat.

Figure 2:
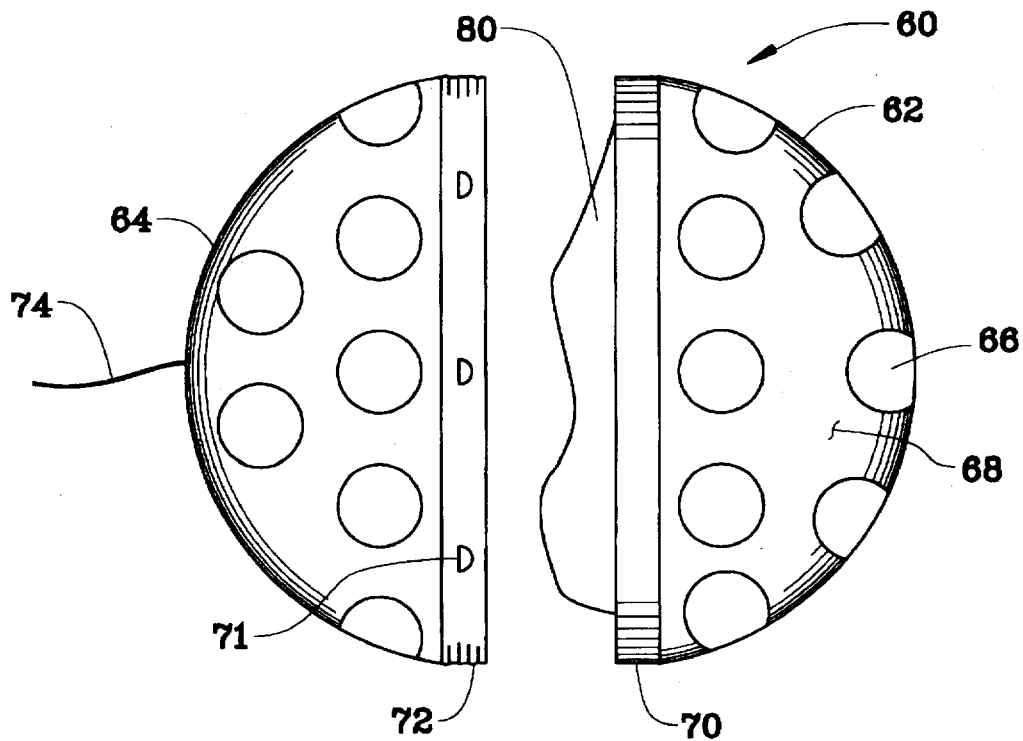
FIG. 2 is an exploded view of the instant invention.

Now referring to FIG. 2 set forth is a housing member 60 preferably consisting of a first semi-circular member 62 and a second semi-circular member 64 which when coupled together form a ball-shaped housing. An inner surface of the housing, not shown, forms an interior chamber with each housing member having a plurality of apertures 66 which fluidly communicate the interior chamber through the outer surface 68.

The housing is preferably made from a rigid or semi-rigid material such as plastic with a diameter of approximately six inches. Alternatively, the housing can be fabricated from fiberglass, corrosion resistant metal, or any other material that is capable of providing rigidity yet allows for fluid passage from an outer surface to an inner chamber. The diameter of the housing is sized to allow for ease of movement within the bilge area in accordance with the multiple fittings and connections as set forth in FIG. 1 which would inhibit movement of larger shaped items within a conventional bilge containment area. However, it should be noted that the suggested size of the bilge ball is not an limitation but only preferred in accordance with a majority of the recreational boating craft currently on the market. Larger yachts or ships may increase the diameter of the ball shaped housing accordingly.

The preferred embodiment utilizes a ball shaped housing consisting of a first member 62 having a peripheral edge 70 with a plurality of detentes, not shown, which engage tabs 71 on second housing member 64 for coupling the members together. Another embodiment employs a male threaded member on the peripheral edge of a first member which is operatively associated with threads located on a peripheral edge of an adjoining member for purposes of coupling the members together. The housing means may include any such embodiment for coupling Which allows for access to an interior chamber including a rubberized coupling between the two members wherein access to the interior chamber is made possible by overcoming the biasing force. In addition, the housing member may consist of a single piece with oversized apertures allowing for the insertion of the absorbent material wherein spent absorbent material can only be removed by physical force. Further, the housing may consist of a singular shape with access to the interior chamber by use of a hatch or hinged component.

The absorbent material is preferably constructed from nonwoven polypropylene having a weight between five and thirty ounces per square yard of large mess material. Polypropylene material has been found most suitable for allowing non viscous fluid to pass through the material yet absorbing petroleum products and which allows subsequent disposal.

In operation the housing is open so as to expose the interior chamber wherein one or multiple sheets of polypropylene is inserted into the housing and the housing closed and placed within the bilge area. A nylon string 74 is secured to the housing and is tied around any component above the level of the bilge area to allow for ease of removal. The housing is then allowed to free float in the bilge area through normal movement of the boat.

When the housing is exhausted, the material is unable to absorb any additional petroleum discharge. The string 74 provides a handle for removal of the housing from the bilge. The interior chamber of the housing is then exposed and the soiled sheets disposed of in accordance with environmental regulations. The housing is then ready to accept a replacement sheet of polypropylene and the housing placed back into the bilge for reuse. The applicants preferred fluid absorption size is eight to sixteen ounces of polypropylene as manufactured from merge #L17915 with #5 Denure fiber from Amaco fabrics. An alternative is polyester but it is believed that the non-woven polypropylene provides longevity in it's application.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

I claim:

1. In a boat bilge area wherein petroleum waste is collected by use of absorbent materials, an improvement in housing of the absorbent materials, said improvement comprising:

a rigid, substantially spherical housing having a first hemispherical shell with an insertion edge and at least one engagement tab releasably secured to a second hemispherical shell having a receptive edge with at least one detent for receipt of said engagement tab, each shell having an inner surface and an outer surface, said inner surface forming an interior chamber with a plurality of apertures fluidly communicating said inner surface and said outer surface;

disposable polypropylene absorbent material removably disposed within said chamber;

and a flexible string coupled to said housing for use in securing said housing in said bilge area;

wherein said petroleum absorbent material is inserted into said housing and said housing is positioned in the bilge area of a boat, whereby fluid in the bilge area flows through said apertures for absorption of petroleum waste.

2. The apparatus according to claim 1 wherein said housing is fabricated from plastic.

3. The apparatus according to claim 1 wherein said housing is fabricated from fiberglass.

4. The apparatus according to claim 1 wherein said housing is fabricated from corrosion resistant metal.

* * * * *